Dec. 9, 1958 V. E. RIMSHA ET AL 2,863,628
INTEGRAL SOLENOID VALVE
Filed March 14, 1955 2 Sheets-Sheet 1

Inventors
VICTOR E. RIMSHA
JAMES A. KOZEL
FRANK E. CERVENY
FORREST R. WOLF
by Hill, Sherman Meroni Gross Simpson Attys Dec. 9, 1958 V. E. RIMSHA ET AL 2,863,628
INTEGRAL SOLENOID VALVE
Filed March 14, 1955 2 Sheets-Sheet 2

Inventors
Victor E. Rimsha
James A. Kozel
Frank E. Cerveny
Forrest R. Wolf
by Attys

United States Patent Office 2,863,628
Patented Dec. 9, 1958

2,863,628

INTEGRAL SOLENOID VALVE

Victor E. Rimsha and James A. Kozel, Chicago, Frank E. Cerveny, Berwyn, and Forrest R. Wolf, Arlington Heights, Ill., assignors to The Dole Valve Company, Chicago, Ill., a corporation of Illinois Application March 14, 1955, Serial No. 494,138

3 Claims. (Cl. 251—30)

The present invention relates to a valve structure and more particularly, the present invention relates to an integral solenoid and valve structure.

Still more particularly, the present invention relates to a valve structure wherein the valve and the solenoid for actuating the valve are in an integral assembly adapted to plug into a female electrical power outlet which may form a part of a fluid control system.

Although the prior art is replete with solenoid actuated valve structures, the present invention represents a new and improved structure and assembly wherein the solenoid and the valve structure are integral as a part of the same assembly and structure, whereby the mechanisms embodying the principles of this invention have greater simplicity of construction, greater simplicity of operation, greater simplicity of maintenance, and are more economical to construct. In addition, structures embodying the principles of the present invention have numerous other advantages such as those which are pointed out immediately hereinbelow and those which will become apparent to those skilled in the art from all understanding of the principles of the invention.

One such other important feature of the present invention is that the solenoid carries terminal members integrally therewith for electrical connection in a plug and socket arrangement whereby the integral solenoid and valve structure may be easily connected and disconnected from a source of electrical power and/or a fluid control system. This feature of the present invention also permits convenient and simple connection of the integral valve and solenoid in a system whereby the integral structure may be easily repaired or replaced in the event of any need to replace or repair the integral solenoid valve structure.

Another feature of the present invention lies in the particular structure of the assembly wherein the valve housing and the solenoid enclosing can are sealed together by the valve diaphragm and further cooperate to maintain the valve diaphragm in its proper operating position in cooperation with a valve seat.

It is, therefore, an important object of the present invention to provide a new and improved combination integral solenoid valve structure.

It is also an important object of the present invention to provide a new and improved integral solenoid valve structure wherein the solenoid is substantially enclosed in a housing can with male solenoid terminal members extending through apertures in an end of the can and insulated therefrom by insulating pants.

Still another important object of the present invention is the provision of an integral solenoid valve assembly wherein the solenoid armature is arranged to open and close the pressure relief aperture in the valve closure block to permit pressure-sensitive valve operation and control the same by control of the solenoid armature.

Still other objects, features and advantages of the present invention will become apparent to those skilled in the art from the following detailed description of the principles of the present invention and an embodiment thereof, from the claims, and from the accompanying drawings in which each and every detail shown is fully and completely disclosed as a part of this specification, in which like reference numerals refer to like parts, and in which:

As shown on the drawings.

Figure 1:
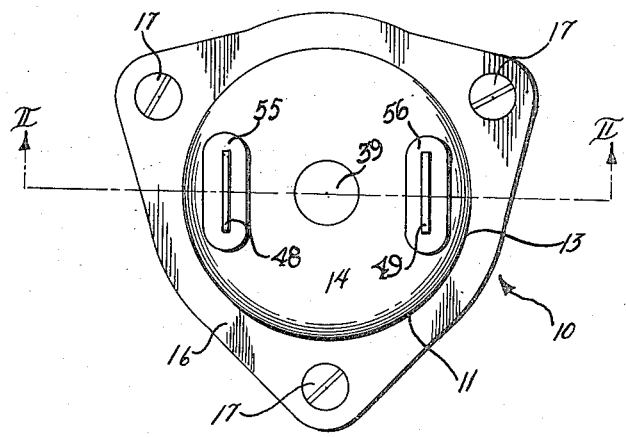
Figure 1 is a plan view of an integral solenoid valve assembly embodying the principles of the present invention.

There is shown on the drawings a combination integral plug-in type solenoid valve structure and assembly 10 wherein a solenoid housing can 11 is secured to a valve housing 12 to cooperatively house and enclose the combination integral assembly.

The can 11 preferably has a substantially cylindrical wall 13 and is closed at one end by a radial wall or face 14 and is open at the other or inner end 15 where it is provided with an integral radially extending flange 16. The flange 16 has a somewhat triangular configuration with apertures therethrough, in the vicinity of the apexes thereof, to receive such convenient securing means as screws 17—17—17, or rivets or the like, for securing the can to the valve housing 12 substantially coaxially therewith.

Although the valve housing 12 may have any particular desired configuration and be of any particular desired size, it is shown here as being of substantially the same configuration as the periphery of the radial flange 16, at least in the vicinity where it is secured to the radial flange 16. Internally, the valve housing 12 has a pair of fluid passages 18 and 19 which are defined by the outer wall 20 of the valve housing 12 and an inner substantially cylindrical wall 21, the walls being substantially coextensive in the region where the flange 16 of the can 11 is secured to the transverse face 22 of the outer wall 20 of the valve housing 12.

The end 23 of the inner cylindrical wall or tube 21 is shown as terminating in a tapered valve seat 24 which terminates slightly inwardly of the valve housing 12 from the radial face 22 of the outer wall 20.

When there is no obstruction, fluid will flow over the valve seat 24 between the passages 18 and 19, and particularly the passage 18 to the passage 19.

To form a valve, however, and a controllable obstruction between the fluid passages 18 and 19 at the valve seat 24, a valve closure block 25 is provided to seat against the valve seat 24. In the particular embodiments shown, the valve closure block is formed, as by molding or the like, of a resilient material such as rubber or a rubber-like material, and integrally with a radially extending pressure-sensitive flexible diaphragm 26 which is also of the resilient material forming the valve closure block 25. At the outer periphery of the diaphragm 26, there is a rib or increased thickness section 27 which is fitted or pressed into an annular recess 28 in the transverse surface 22 of the outer wall 20 of the valve housing 12. The rib 27 is secured in the recess 28 and the flange 16 of the can 11 overlies the annular recess 28 and the rib 27 peripherally about the diaphragm 26. The radially inner region of the outer wall 20 of the valve housing 12 may be axially reduced slightly as at 29 to accommodate the thickness of the pressure-sensitive diaphragm 26 between that reduced portion and the inner terminus of the flange 16 on the can 11.

The valve closure block 25, which is provided with a substantially hard stiffening insert 30 that is substantially cylindrical, with a flange at one end thereof that is molded into the block 25, is arranged to be seated against the seat 24 and to permit unseating from the seat 24 through cooperation of the block 25 with a poppet headed solenoid armature 31 substantially coaxially arranged with the several parts of the assembly. The armature 31 having a poppet-like head 32 which is substantially conical, is spring-biased toward the valve closure block 25 by a compression-type biasing spring 33. While the biasing spring 33 biases the armature or valve pin 31 toward the valve closure block 25, operation and movement of the armature 31 is controlled by the solenoid assembly 34 within the enclosing can 11 which when energized moves the valve pin or armature 31 away from the valve closure block 25 and which when deenergized permits the valve pin to move toward the valve closure block 25 so that the head 32 of the valve pin or armature 31 engages the valve closure block.

In operation of the valves of all three embodiments of the invention illustrated in the drawings, when the valves are closed and in the position as shown on the drawings, fluid is present at inlet pressure in the inlet passage 18 and this fluid bleeds through bleeding apertures 35 in the diaphragm or flexible portion 26 of the valve closure member 25. The inlet fluid at the inlet pressure bleeding through the bleeding orifices fills a chamber immediately above the valve closure member and surrounding the poppet head 32 of the armature or valve pin 31. Since fluid has been drained from the outlet 19, the pressure differential operating across the valve closure member 25 acts to maintain the valve closed by maintaining the valve closure member 25 forced against the valve seat 24 and thereby maintains the valve closed. At the same time, the poppet head 32 of the valve pin or armature 31 being biased against the valve closure member 25 by the spring 33 maintains an axial aperture or pressure relief aperture 36 in the block 25 and stiffening member 30 closed.

Upon energization of the solenoid assembly 34, the armature 31 is lifted from the block 25 so that the fluid at inlet pressure above the closure member 26 and block 25 may be exhausted through the pressure relief aperture 36. Under such conditions, the fluid pressure at the inlet 18 is sufficiently greater than the fluid pressure above the valve closure member to lift the valve closure member from the seat 24 and thereby open the valve for flow over the valve seat 24 and the free end 23 of the inner passage walls 21 for fluid flow from the passage 18 to the outlet passage 19. At the same time, any inlet fluid passing through the bleeding orifices 35 will be exhausted from the chamber above the valve closure member through the relief aperture 36.

Deenergization of the solenoid in the assembly 34 permits the armature 31 to be biased towards the block 25 so that the poppet head 32 thereof will seat on the relief aperture closing seat 37 and thereby close the relief aperture 36. Under such conditions, fluid at inlet pressure bleeding into the chamber above the valve closure member cannot be exhausted through the relief aperture and the pressure in that chamber will thus increase to inlet pressure which will thereby force the closure member against the seat 24 and close the valve and cut off fluid communication between the inlet 18 and the outlet 19.

Figure 2:
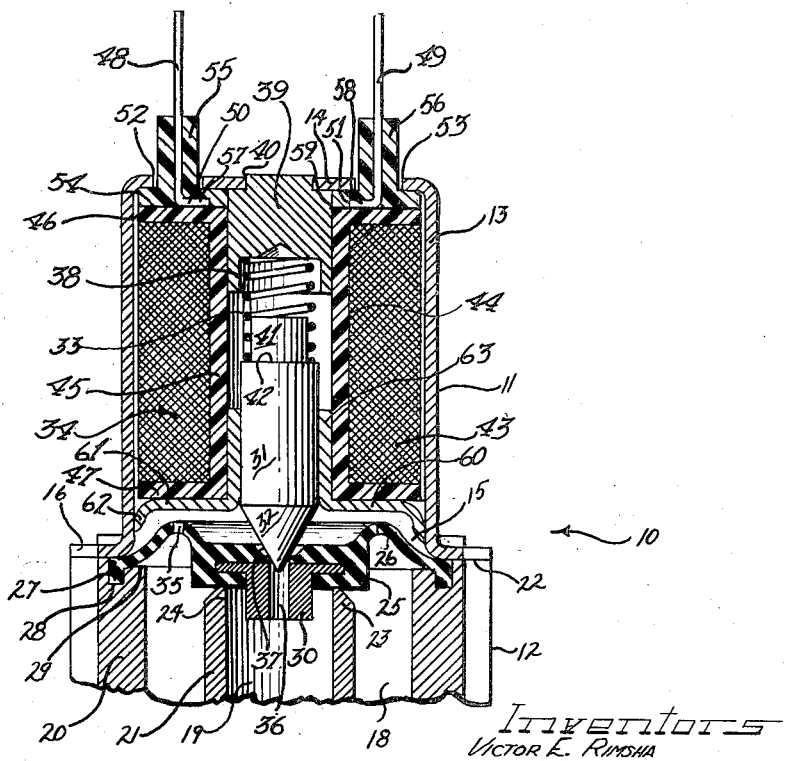
Figure 2 is a fragmental sectional view of the combination integral assembly shown as taken substantially along the line II—II of Figure 1.

In the embodiment of the invention illustrated in Figure 2, the spring 33 is seated in an axial seat recess 38 in the inner end of a plug 39 which is locked, as by swaging or the like, in a central aperture 40 in the inner face of the wall 14 of the can 11. The inner end of the armature 31 is radially reduced to form a spring retaining post 41 integrally thereon and a spring seating shoulder 42, so that the spring 33 is seated in the backing plug recess 38 and against the shoulder 42 and about the retaining radially reduced portion 41 to bias the poppet head 32 of the armature or valve pin 31 toward the valve closure block 25.

The armature or valve pin 31 is axially reciprocable substantially coaxially in the solenoid can 11 and substantially coaxially within the solenoid assembly 34 which is formed by winding a coil 43 on a spool 44 formed of a suitable insulating material such as nylon or the like or other plastic compositions which are electrically insulating. The spool 44 has a hollow spindle 45 and a pair of radial flanges 46 and 47.

The outer radial flange 46 of the spool 44 has secured thereto at diametrically opposite positions thereon, a pair of axial or longitudinally extending male plug-like terminal bars 48 and 49 to which the ends of the conductor forming the coil 43 are respectively secured.

The integral construction of the spool 44 and the male plug terminal bars 48 and 49 which are secure thereto is permissive of an improved coil winding technique which greatly simplifies formation of the solenoid and attachment to the terminals thereof, since the conductor ends may be easily connected thereto. The inner ends of the terminal bars are turned-under L ends 50 and 51 for conveniently securing the same to spool flange 46. Further, the terminal bars 48 and 49 extend longitudinally outwardly from the can 11 through appropriately configurated and enlarged apertures 52 and 53 respectively. These apertures 52 and 53 are appropriately provided in the end face or wall 14 of the can 11.

To insure insulation of the terminal posts from the can 11, there is provided an insulating member 54 which has the same outer diameter as the flanges 46 and 47 and which is provided with a pair of longitudinally outwardly extending pants or legs 55 and 56. These pants or legs 55 and 56 have a length somewhat less than the length of the terminal bars which they surround, namely the terminal bars 48 and 49 respectively, but they insulatingly enclose the terminal bars 48 and 49 in the apertures 52 and 53 of the can 11. Also, the insulator 54 has a pair of relatively short recesses 57 and 58 therein to receive the underturned ends 50 and 51 of the terminal bars 48 and 49.

The insulator 54 is also provided with a central or axial aperture 59 which is of the same diameter as the axially extending hollow in the spindle 45 of the spool 44. This diameter is such that the assembly will have a snug, substantially sealing fit on the plug 39 which will thereby serve to aid in retaining the solenoid 34 within the can 11 and coaxially position the same therein.

To further aid in sealing the solenoid from the fluid in the valve region of this combination assembly, and to retain the solenoid 34 in a proper coaxial position within the housing 11, there is provided an inner plate 60 which extends radially within the can 11 near the open end 15 thereof and which has a radial wall 61 to lie against the spool flange 47. A peripheral flange 62 on the plate 60 press fits with the inner face of the cylindrical wall 13 of the can 11 and substantially seals the solenoid from the valve region of the combined assembly as well as retains solenoid within the can 11. An integral hollow spindle 45 is maintained in the solenoid housing can 11 by the inner plate 60 and is arranged to coaxially position the solenoid 34 therein and guide the solenoid armature 31.

In operation, the male plug-in type terminals 48 and 49 of this combination integral solenoid valve assembly are adapted to be plugged into a female receptacle which may be connected to a source of electrical energy or solenoid energizing power through a valve control system to controllably energize the winding 43 of the solenoid 34.

Figure 3:
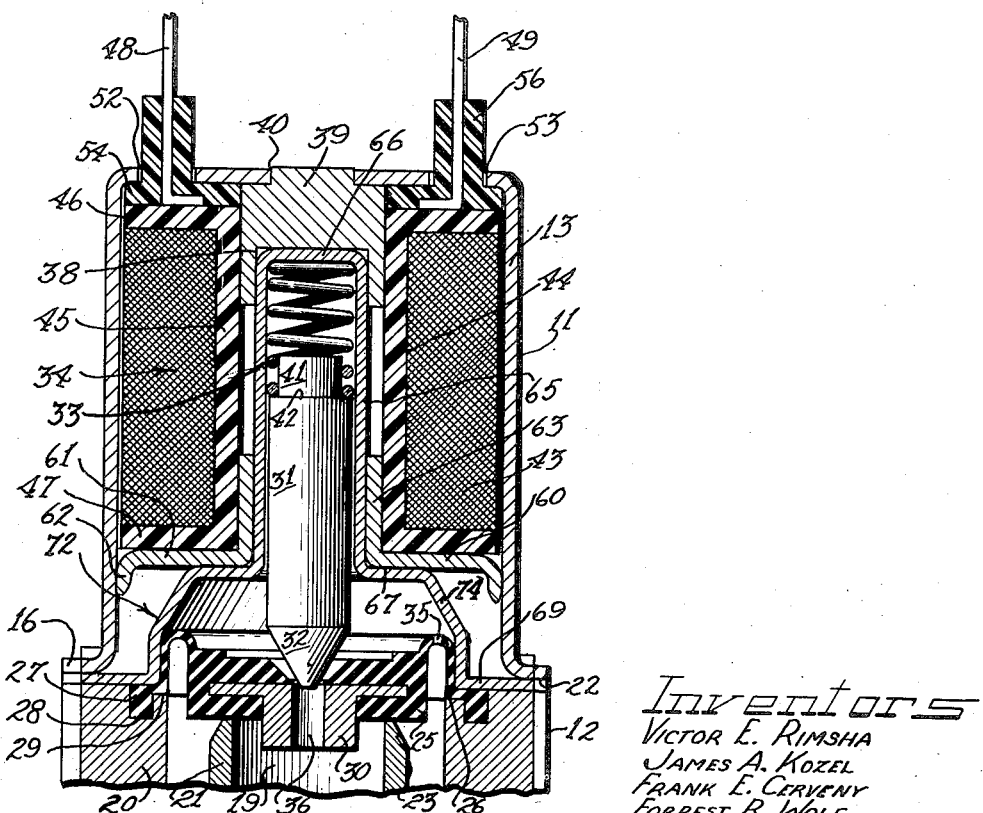
Figure 3 is a fragmental sectional view similar to Figure 2 but illustrating another embodiment of the invention.

The embodiment of the invention illustrated in Figure 3 is substantially identical to the embodiment illustrated in Figure 2 except that in addition it is provided with a solenoid armature guide and solenoid sealing member indicated generally at 72. This member 72 is a substantially cup-shaped member which may be formed of a fluid impervious material such as metal or plastic or the like and has a cylindrical cupped portion 65 terminating in a closed end 66 fitting into the recess 38 in the plug 39. The diameter of the cylindrical guide portion 65 is such that it also slidably fits through the hollow flange or boss 63 on the inner plate 60. With this member in place in the solenoid assembly, a slightly smaller diameter armature 31 is employed and the spring 33 seats against the closed cupped end 66 instead of in the recess 38.

The sealing member 72 is further provided with an intermediate flange portion 67 which terminates in a somewhat conical portion 74 leading to an end flange 69 bearing on the upper transverse face 22 of the outer housing walls 20 and further bearing on the rim 27 of the valve closure member.

The cup-shaped member for sealing the solenoid from the fluid passages is secured in place by securing the solenoid can 11 thereover. When so secured in place the solenoid is completely sealed from any possible liquid entering the same since all liquid flowing through the system that may enter the chamber above the valve closure member is confined within the sealing member and armature guide. The sealing member 72 has the additional advantage of providing a smooth and efficient full travel length guide which is smooth for efficient operation and controlled movement of the solenoid armature 31.

Figure 4:
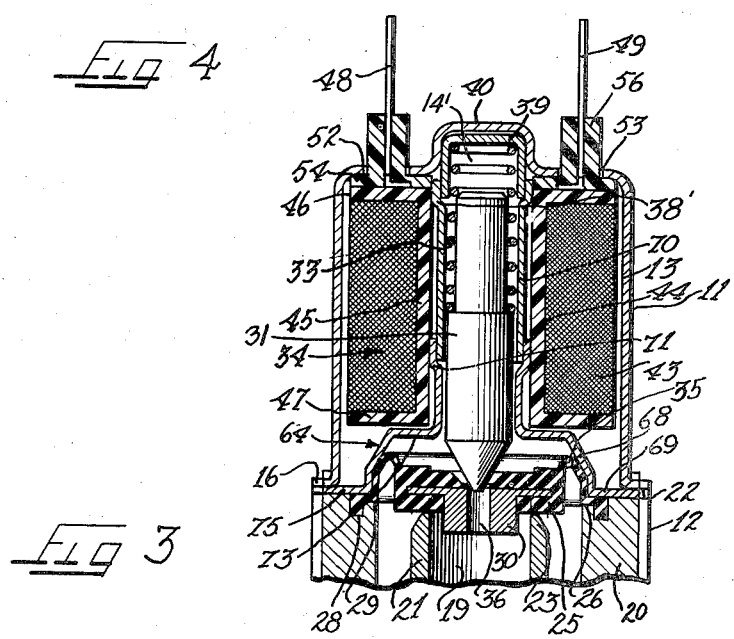
Figure 4 is a fragmental sectional view similar to Figure 2 but illustrating still another embodiment of the invention.

In the embodiment of the invention illustrated in Figure 4, the plug 39 has been omitted and there has been substituted therefor a spring seating and sealing cap 39' which seats in a cupped portion 40' in the upper end 14' of the can 11. The cupped member 39' not only operates as a spring seat for the spring 33 but further is sealingly secured to the end of a stepped flange substantially cylindrical-shaped armature guide 70 which in turn is sealingly secured in a stepped flange 71 of a second armature guide and end plate solenoid sealing member 64. The stepped flange at 71 is of sufficient dimensions to accept the lower end of the guide 70 for sealing such as by soldering or welding the two parts together while the other end of the guide 70 has a stepped flange 38' similarly proportioned for accepting and being sealed with the free end of the cup 39' also as by soldering or welding or the like or merely by a relatively tight or press-fit.

An intermediate portion of the guide and sealing member 64 is flared outwardly as at 73 just as the member 72 in Figure 3 is flared outwardly at 67. A somewhat conical portion 68 then leads to an end flange 75 which is sealed to the valve housing by lying on the upper transverse face 22 thereof and being enclosed between the outer wall 20 and the can 11. This embodiment of the invention also provides for efficient and smooth guiding of the armature 31' and further for efficient sealing of the solenoid assembly from the fluid in the valve.

From the foregoing, it will be observed that there is provided in accordance with the principles of the present invention a new and improved integral solenoid valve of which numeral variations and modifications may be made without departing from the spirit and scope of the novel concepts and principles of this invention. We, therefore, intend to cover all such modifications and variations as fall within the true spirit and scope of the novel concepts and principles of this invention.

We claim as our invention:

1. In an integral solenoid valve assembly, a housing having a partitioning member therein forming a pair of fluid passages and having an aperture therein for fluid communication between said passages, a valve seat surrounding said aperture, a valve closure block of resilient material having a pressure relief aperture therein, a solenoid assembly secured to said housing and cooperating therewith to secure said block in operative association with said valve seat, said solenoid assembly comprising a housing can having apertures therein, a coil form wound on a hollow spindle spool substantially sealed in said can, plug-in type terminals secured to said spool and extending through the apertures in said can, and an armature axially reciprocable in said hollow spool and arranged to close said pressure relief aperture in said block and to open the same whereby fluid pressures on said block are effective to move said block against said seat and away therefrom.

2. In an integral solenoid valve assembly, a housing having a partitioning member therein forming a pair of fluid passages and having an aperture therein for fluid communication between said passages, a valve seat surrounding said aperture, a valve closure diaphragm of resilient material having a pressure relief aperture therein and located across the end of the housing, a solenoid operated valve means adapted to open and close said pressure relief aperture, a solenoid assembly including a coil and an armature operatively associated with said solenoid operated valve means, a sealed can containing the solenoid assembly and attached to said housing over the diaphragm and forming a pressure chamber above the diaphragm into which the solenoid operated valve means extends, an open central passageway through the can communicating with the pressure chamber above the diaphragm containing the solenoid armature, a plug inserted into the open end of the passageway to seal the armature within the passageway, and a pair of plug-in terminals projecting from the sealed can and electrically connected to the solenoid coil.

3. In an integral solenoid valve assembly, a housing having a partitioning member therein forming a pair of fluid passages and having an aperture therein for fluid communication between said passages, a valve seat surrounding said aperture, a valve closure diaphragm of resilient material having a pressure relief aperture therein and located across the end of the housing, a solenoid operated valve means adapted to open and close said pressure relief aperture, a solenoid assembly including a coil and an armature operatively associated with said solenoid operated valve means, a sealed can containing the solenoid assembly and attached to said housing over the diaphragm and forming a pressure chamber above the diaphragm into which the solenoid operated valve means extends, a cylindrical shell within the sealed can having a flared end projecting to the location of attachment between the can and housing and clamped therebetween and forming an inner chamber over the diaphragm within said pressure chamber, the zone outside of said flared end within said can providing a sealed chamber for the solenoid coil, and a pair of plug-in terminals projecting from the sealed can and electrically connected to the solenoid coil.

References Cited in the file of this patent

UNITED STATES PATENTS

| | | |
|---|---|---|
| 1,664,612 | French | Apr. 3, 1928 |
| 2,305,151 | Fields | Dec. 15, 1942 |
| 2,379,181 | Pontius | June 26, 1945 |
| 2,502,591 | Ray | Apr. 4, 1950 |
| 2,562,315 | Kempton | July 31, 1951 |
| 2,624,542 | Ghormley | Jan. 6, 1953 |